(12) United States Patent
Keller

(10) Patent No.: US 6,771,045 B1
(45) Date of Patent: Aug. 3, 2004

(54) SYSTEMS AND METHODS FOR BATTERY CHARGING AND EQUALIZATION

(75) Inventor: Jesse P. Keller, San Diego, CA (US)

(73) Assignee: ISE Corporation, San Diego, CA (US)

(*) Notice: Subject to any disclaimer, the term of this patent is extended or adjusted under 35 U.S.C. 154(b) by 0 days.

(21) Appl. No.: 10/236,379

(22) Filed: Sep. 5, 2002

(51) Int. Cl.[7] .................. H01M 10/44; H01M 10/46
(52) U.S. Cl. ......................................... 320/118
(58) Field of Search ......................... 320/116, 118, 320/119, 120, 121

(56) References Cited

U.S. PATENT DOCUMENTS

| | | | |
|---|---|---|---|
| 5,900,716 A | * | 5/1999 | Collar et al. |
| 6,114,835 A | * | 9/2000 | Price |
| 6,140,800 A | * | 10/2000 | Peterson |
| 6,150,795 A | * | 11/2000 | Kutkut et al. |
| 6,271,645 B1 | * | 8/2001 | Schneider et al. |

* cited by examiner

*Primary Examiner*—Edward H. Tso
(74) *Attorney, Agent, or Firm*—Stephen C. Beuerle

(57) ABSTRACT

A method and system for charging and equalizing battery packs in a battery power system by transferring charge between battery packs. The method involves determining if a battery pack is a candidate for charging, selecting a battery pack to transfer charge from, and transferring charge between the battery packs until an equalizing charge level is accomplished between the battery packs.

32 Claims, 5 Drawing Sheets

SYSTEMS AND METHODS FOR BATTERY CHARGING AND EQUALIZATION

BACKGROUND OF THE INVENTION

1. Field of the Invention

The field of the present invention is generally battery charging, and in particular systems for charging and equalization by shuffling charge between battery packs.

2. Background

Systems of batteries are used as a power source in a variety of applications, such as batteries used in electric and electric-hybrid vehicles to power the motor or accessories. However, the utility of battery power is reduced by factors that decrease the lifetime of individual batteries in the battery power system. Batteries within the same battery power system will charge and discharge at different rates due to different temperatures, construction and materials. As a result, the charge levels of the batteries will differ over time. When the battery power system is charged to bring lower charged batteries to a full charge, the higher charged batteries will be overcharged thereby reducing lifetime. Yet, if the charge to the battery power system is lessened to avoid overcharging the higher charged batteries, the output of the battery power system will be less than full capacity.

More specifically, the following discussion describes batteries or battery packs connected in series. For the purposes of this invention a plurality of batteries connected in parallel are the same as a single battery. Charge equalization devices have been developed to balance charge levels between battery pairs within a battery power system, thereby reducing the risk of overcharging individual batteries when the battery power system is charged. When the voltage of one battery in the pair is higher than the voltage of another battery in the system by a certain amount, a conventional charge equalization device transfers charge from the higher charged battery to the lower charged battery. The charge equalization device can be configured to transfer charge until the difference in charge levels between batteries is below a designated amount. This process of equalizing charge levels between the batteries can be repeated until all batteries within a battery power system have a consistent charge level.

The conventional charge equalization device is not designed, however, to independently charge an individual battery connected within a plurality of batteries to full capacity. Using charge equalization alone, the highest achievable charge level of a battery is always less than the charge level of the other battery in the equalization pair, i.e., the battery is undercharged. After a sufficient period of undercharging, the portion of the battery cell that has not been charged may no longer be available and the lifetime of batteries will be reduced. The lifetime of certain types of batteries can also be diminished by a memory effect. The memory effect occurs when a battery cell is regularly charged such that the charge does not fall below a particular level. After a sufficient period of time, the battery capacity is lessened because only the portion of the battery cell that has been charged will be available for use and the lifetime of the battery cell is thereby diminished.

SUMMARY OF THE INVENTION

A method and system for charging and equalizing battery packs in a battery power system by transferring charge between battery packs. For purposes of this specification and the claims that follow, the term 'battery pack' can represent an individual battery cell or a plurality of battery cells in a module or a plurality of modules. The method can comprise determining if a battery pack is a candidate for charging, selecting a battery pack to transfer charge from, transferring charge, discontinuing charge transfer, and equalizing charge level between battery packs in the battery power system. This charge-then-equalize process can be repeated for each battery pack in a plurality of battery packs. The method can also comprise discharging a battery pack prior to charging in order to counter the memory effect.

The system of battery charging and equalization can comprise a battery charging and equalization unit coupled with a plurality of battery packs, wherein the unit comprises any configuration capable of performing the method of battery charging and equalization. In one embodiment, the battery charging and equalization unit comprises a charge shuffler and a processor. Specifically, the processor can be coupled with each battery pack to monitor charge data. The charge shuffler can be embodied as a DC-to-DC converter that is capable of transferring charge between battery packs. The charge shuffler is coupled with each of the plurality of battery packs. The processor is coupled with the charge shuffler to direct the transfer and equalization of charge between battery packs. The processor can also direct the charge shuffler to transfer charge from the first battery pack to one or more other battery packs, thereby draining the first battery pack. Other aspects, features and embodiments are disclosed in the detailed description that follows and are described in relation to the following figures.

BRIEF DESCRIPTION OF THE DRAWINGS

Preferred embodiments of the present inventions taught herein are illustrated by way of example, and not by way of limitation, in the figures of the accompanying drawings, in which FIG. 1 schematically illustrates a method for battery charging and equalization in accordance with an embodiment of the present invention.

DETAILED DESCRIPTION OF THE PREFERRED EMBODIMENTS

Figure 1:
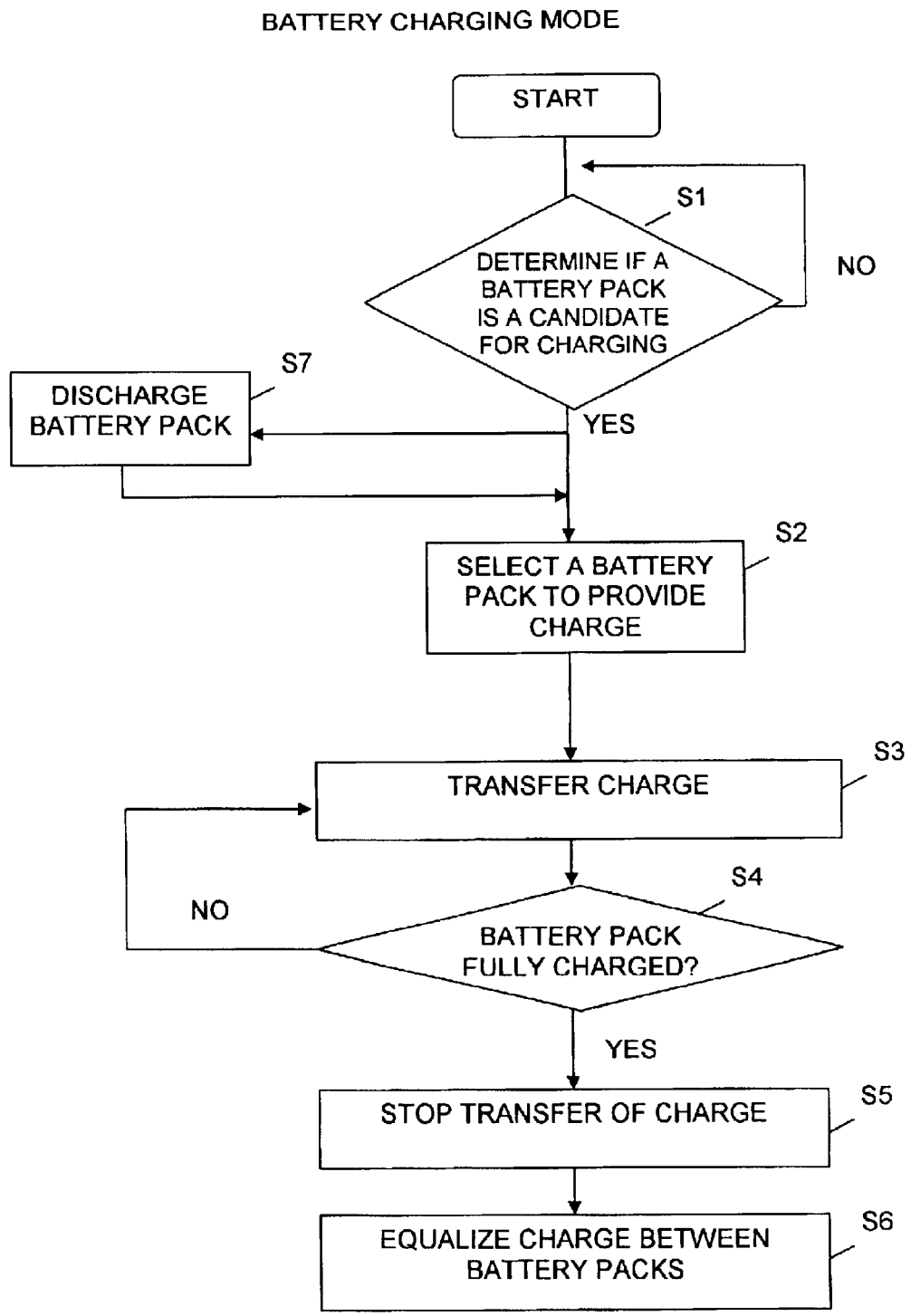

Turning in detail to the drawings, the flow chart in FIG. 1 illustrates an exemplary method for individually charging battery packs by shuffling charge between battery packs and then equalizing charge levels between battery packs.

Step 1 is to identify a battery pack that is a suitable candidate for charging. The decision to charge a battery pack can be based on the initial charge level of the battery pack, the time since the last charge, a command from an external user, and/or any other mechanism suitable for determining that the charging process should be initiated.

If a first battery pack is a candidate for charging, charge can be shuffled to the first battery pack from a second battery pack. As depicted in Step 2, a second battery pack suitable to supply charge is identified. Charge is transferred from the second battery pack to the first battery pack in Step 3, thereby charging the first battery pack. As shown in Step 4, the transfer of charge can be continued until the battery pack receiving charge is determined to be fully charged, then charge transfer can be discontinued in Step 5. For example, the determination that a battery pack is fully charged can result when the first battery pack has a charge level above an amount defined to designate the battery pack as fully charged. Although not shown in FIG. 1, the decision to discontinue charge transfer can also be based on a function of time, an external user, or any other mechanism suitable for ending the charging process. Also, one or more battery packs can be used to supply charge to a battery pack, i.e. repeating Steps 2, 3, 4, and 5 until charge transfer is determined to be complete.

To restore a consistent charge level between battery packs, the charge levels are equalized in Step 6. In charge equalization, the charge level of each battery pack is monitored as the charge from the higher charged first battery pack is transferred to the lower charged second battery pack. This process of charging then equalizing battery packs can be repeated for a plurality of battery packs to mitigate the effect of chronic undercharging. The need to connect to a device external to the battery packs is avoided, which is especially valuable where battery packs comprise a source of power for a vehicle or other mobile device.

The method for battery charging and equalization can also include discharging, then charging a battery pack to alleviate a potential memory effect. Step 7 of FIG. 1 illustrates discharge of the battery pack prior to charge transfer. Discharge of the battery pack can include transferring charge to another battery pack and/or charge can be discharged out of the system of battery packs. The discharged battery pack can be charged and equalized in accordance with Steps 2, 3, 4, 5, and 6 of FIG. 1. Although not shown in FIG. 1, the discharged battery pack can also be recharged without being fully charged by proceeding to charge equalization (see Step 6) after discharge is complete.

In addition to the method for battery charging and equalization illustrated in the flow chart of FIG. 1, the charge level of battery packs can be equalized whenever the difference in charge levels exceeds a designated amount. While the method for battery charging and equalization depicted in FIG. 1 is best suited for battery packs that are not in use at the time, regular equalization can also occur when the power from the battery packs is being utilized.

Figure 2:
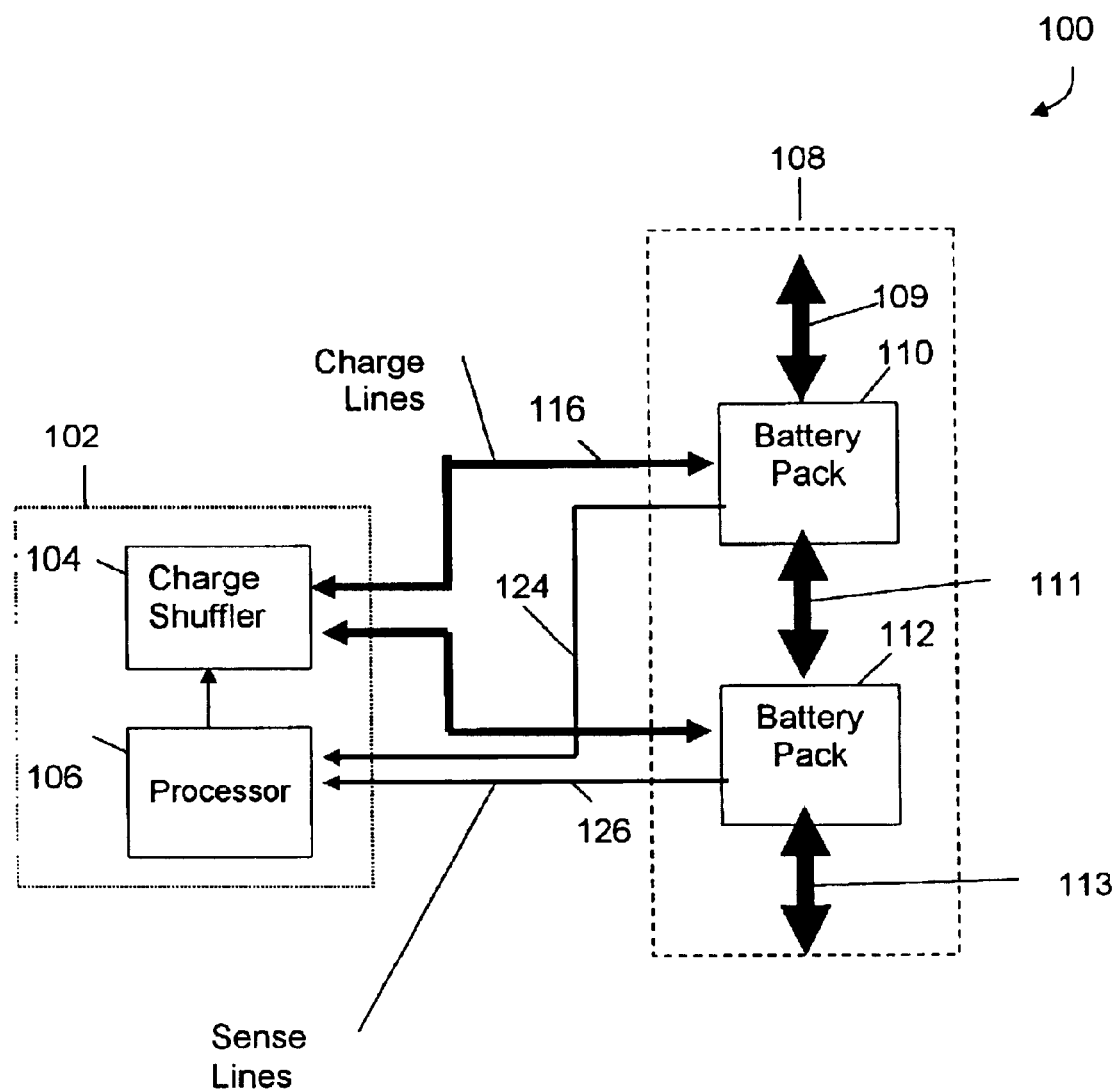
FIG. 2 schematically illustrates a system of battery charging and equalization in accordance with an embodiment of the present invention.

A battery charging and equalization system according to the present invention is illustrated in FIG. 2. Battery charging and equalization system 100 comprises a battery charging and equalization unit 102 coupled with each of a pair of battery packs 110 and 112 that comprise battery power system 108. The battery charging and equalization unit 102 illustrated in FIG. 2 comprises a processor 106 coupled with a charge shuffler 104, where the processor 106 and charge shuffler 104 are each further coupled with each of battery packs 110 and 112. However, battery charging and equalization unit 102 can be comprised of any configuration capable of completing the method for battery charging and equalization described herein when coupled with a battery power system 108. Two battery packs are shown in FIG. 2 for the purpose of illustration, although battery power system 108 can comprise more than two battery packs, each connected to battery charging and equalization unit 102. Furthermore, each battery pack in battery power system 108 can comprise a single battery cell or a plurality of internally or externally connected batteries.

Processor 106 depicted in FIG. 2 can monitor the charge level of each battery pack via monitoring lines 124 and 126, respectively. For example, the charge level data obtained can be used to determine if a battery pack is a candidate for charging (Step 1 of FIG. 1), if a battery pack is suitable to provide charge (Step 2 of FIG. 1), if a battery pack is fully charged (Step 4 of FIG. 1), or if a battery pack is discharged (Step 7 of FIG. 1). In addition, processor 106 can be configured to receive other charge data from battery packs 110 and 112, such as charge and discharge profiles. Using charge level data obtained from battery packs 110 and 112, processor 106 can be configured to control operation of charge shuffler 104 in order to direct the flow of charge between battery packs 110 and 112. To charge battery pack 110, processor 106 can direct charge shuffler 104 to receive charge from battery pack 112 via charge line 116 and transfer charge to battery pack 110 via charge line 118 (Step 3 of FIG. 1). Alternatively, processor 106 can direct charge shuffler 104 to transfer charge from battery pack 110 to battery pack 112. Optimally, the charged battery packs will be restored to full capacity. Charge shuffler 104 can comprise a DC-DC converter or any other appropriate system configured to transfer charge between battery packs.

After either battery pack 110 or 112 is charged, processor 106 can then direct charge shuffler 104 to equalize charge levels between battery pack 110 and 112 (see Step 6 of FIG. 1). To equalize charge levels, processor 106 directs charge shuffler 104 to transfer charge from the higher charged of battery packs 110 and 112 to the other, lower charged battery pack. Processor 106 can enable transfer of charge through charge shuffler 104 until the difference between the charge levels of battery packs 110 and 112 is below a specified amount In turn, each battery pack in a plurality of battery packs can be charged and equalized by transferring charge between battery packs via charge shuffler 104 as directed by processor 106.

In order to counter a memory effect, processor 106 can direct charge shuffler 104 to receive charge from battery pack 110 via charge line 116 and transfer that charge to battery pack 112 via charge line 118, thereby reducing the charge level on battery pack 110. Optimally, the charge of battery pack 110 will be fully drained. Alternatively, processor 106 can direct charge shuffler 104 to transfer charge from battery 112 to battery pack 110 and reduce, and optimally drain, the charge level of battery pack 112. After the charge level on either battery pack 110 or 112 is reduced, processor 106 can then direct charge shuffler 104 to equalize charge levels between battery pack 110 and 112. In turn, each battery pack in a plurality of battery packs can be drained then charged.

In addition to charge equalization after periodic battery pack charging, battery charging and equalization unit 102 can be configured to regularly equalize charge level between battery packs 110 and 112. For example, when the difference in charge level between battery packs 110 and 112 exceeds a specified amount, processor 106 can direct charge shuffler 104 to transfer charge from the higher charged battery pack to the lower charged battery pack until the difference in charge is below the specified amount. This charge equalization between pairs of battery packs can be repeated to maintain a consistent level of charge among all battery packs in battery power system 108.

Battery charging and equalization unit 102 can comprise a variety of configuration capable of carrying out the method of battery charging and equalization described in the present invention. For example, although not shown in FIG. 2, battery charging and equalization unit 102 can comprise multiple processors, such as a plurality of microprocessor or microcontrollers, one or more Digital Signal Processors (DSPs), etc. For example, unit 102 can comprise processor 106 coupled with separate monitor configured to monitor battery pack charge data Unit 102 can also comprise a separate analog-to-digital converter coupled with processor 106 directly or via the separate charge level monitor. Battery charging and equalization unit 102 can also comprise processor 106 and the charge shuffler 104 as part of a single processing system In an alternative embodiment of system 100 illustrated in FIG. 3, battery charging and equalization unit 102 comprises a processor 106, a higher capacity shuffler 107 and two lower capacity shufflers 136 and 138. The battery power system 108 in FIG. 3 coupled with unit 102 is comprised of three battery packs 110, 112 and 114 for the purpose of illustration, although battery power system 108 can comprise a plurality of battery packs, each connected to unit 102. Each of battery packs 110, 112 and 114 can comprise a single battery cell or a plurality of internally or externally connected batteries. The two lower capacity shufflers are also shown for illustrative purposes, although battery charging and equalization unit 102 can comprise a plurality of lower capacity shufflers each coupled with processor 106 and a pair of battery packs.

Figure 3:
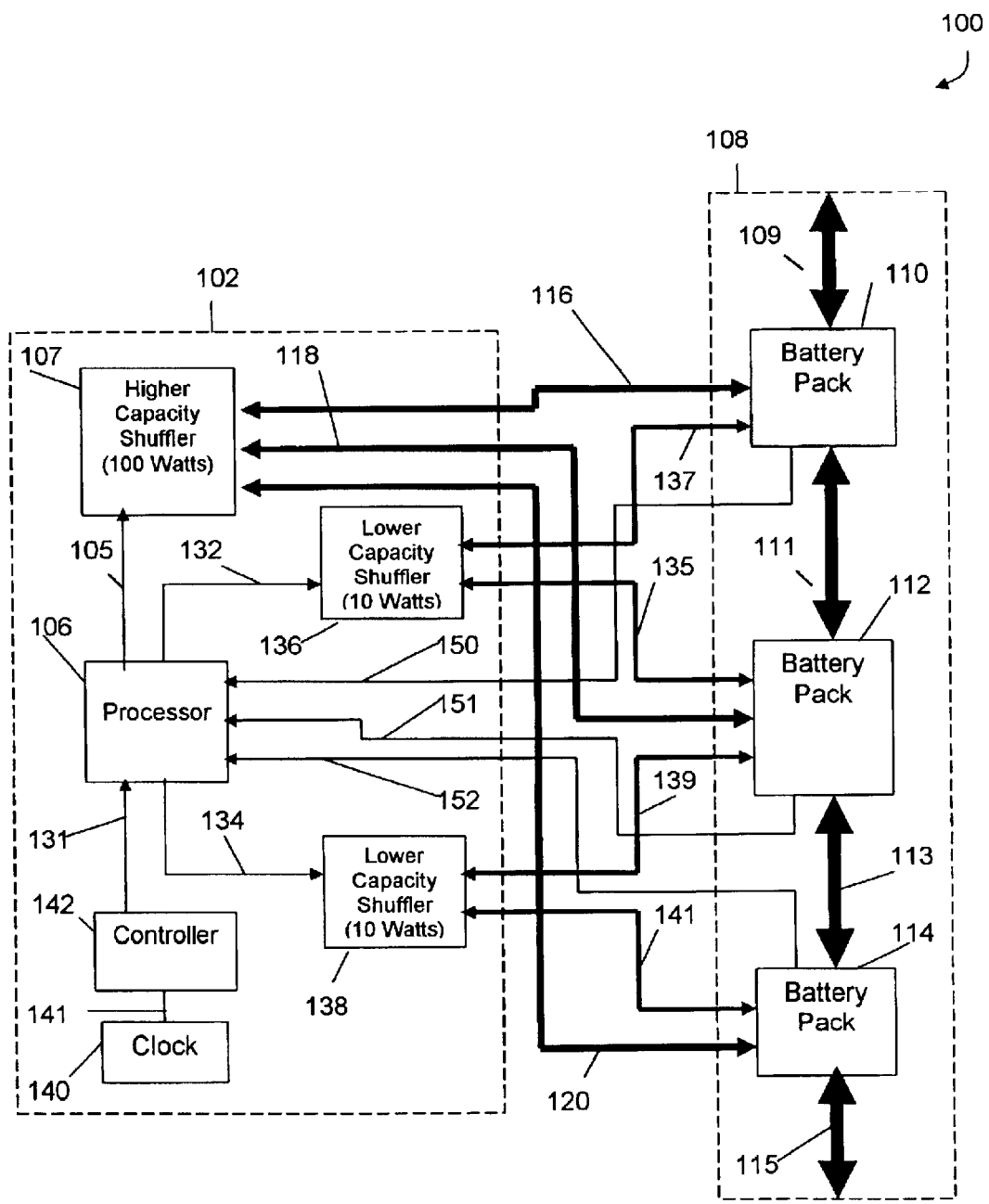
FIG. 3 schematically illustrates a system of battery charging and equalization in accordance with another embodiment of the present invention.

In the embodiment illustrated in FIG. 3, processor 106 is coupled with each of battery packs 110, 112, and 114 to receive charge level data through sense lines 150, 151, and 152. Processor 106 is also coupled with higher capacity shuffler 107 in order to control operation of the higher capacity shuffler 107. Higher capacity shuffler 107 is coupled with each of battery packs 110, 112, and 114 via charge lines 116, 118 and 120, respectively. Higher capacity shuffler 107 is configured to transfer charge between any two battery packs. For example, higher capacity shuffler 107 can receive charge from battery pack 110 and transfer that charge to battery pack 112 and/or battery pack 114. Processor 106 can direct the higher capacity shuffler 107 to charge, drain and/or equalize the charge level of battery pack 110, 112, or 114 by transferring charge between battery packs 110, 112 or 114. The processor 106 and the higher capacity charge shuffler 107 can be part of the same apparatus or separate.

Processor 106 can be further coupled with lower capacity shufflers 136 and 138 to direct equalization between battery pack pairs. Lower capacity shufflers 136 and 138 are coupled with each pair of battery packs to transfer charge between the pair of battery packs. Specifically, low capacity shuffler 136 is configured to equalize charge between battery packs 110 and 112 via charge lines 135 and 137, and low capacity shuffler 138 is configured to equalize charge between battery packs 112 and 114 via charge lines 139 and 141. Higher capacity shuffler 107 can also be configured to equalize charge between pairs of battery packs in addition to the lower capacity shufflers 136 and 138. Although not shown in FIG. 3, lower capacity shufflers 136 and 138 can also comprise a processor that directs the equalization process, thereby eliminating the need for communication lines 132 and 134 between processor 106 and lower capacity charge shufflers 136 and 138.

Higher capacity shuffler 107 is configured to transfer charge faster than lower capacity shufflers 136 and 138. Higher capacity shuffler 107 can be sized to ensure that charging of individual battery packs 110, 112 and 114 can be completed within a reasonable amount of time while the battery power system 108 is not being utilized. Lower capacity shufflers 136 and 138, which are expected to be less expensive and smaller, can be used for charge level equalization The charge level equalization can occur at any time whether or not the battery power system 108 is being utilized.

Processor 106 can direct operation of charge shufflers 107, 136 and 138 by controlling a disable/enable input and relays of the charge shufflers, or any other controls suitable for manipulating the function of charge shufflers 107, 136 and 138. Processor 106 can be coupled, via a communications bus 131, with a controller 142 that can direct operation of the processor 106 based on commands to the controller 142 and/or indications from a clock 140 coupled with the controller 142 via the communication line 141 The controller 142, clock 140, and processor 106 can be part of the same apparatus or separate.

Figure 4:
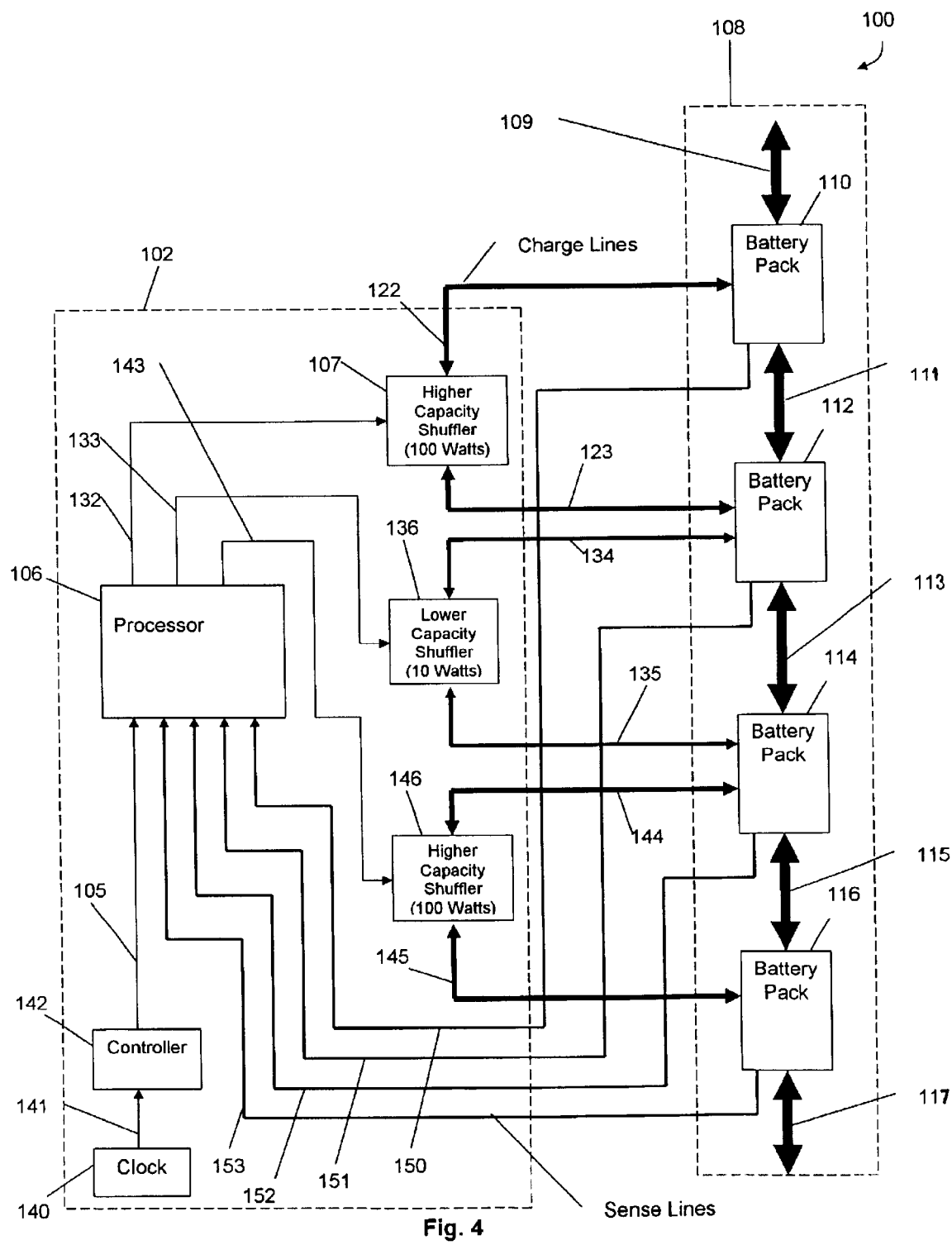
FIG. 4 schematically illustrates a system of battery charging and equalization in accordance with another embodiment of the present invention.

In an alternative embodiment of system 100 illustrated in FIG. 4, battery charging and equalization unit 102 comprises a processor 106, two higher capacity shufflers 107 and 146, and lower capacity shuffler 136. The battery power system 108 in FIG. 4 coupled with unit 102 is comprised of four battery packs 110, 112, 114 and 116 for the purpose of illustration, although battery power system 108 can comprise a plurality of battery packs, each connected to unit 102 Each of battery packs 110, 112, 114 and 116 can comprise a single battery cell or a plurality of internally or externally connected batteries.

The configuration illustrated in FIG. 4 differs from FIG. 3. by way of the connection of the charge shufflers to the battery packs. FIG. 4 shows each charge shuffler 107, 136 and 146 connected to two battery packs. The lower capacity shuffler 136 is connected to battery packs 112 and 114, higher capacity shuffler 107 is connected to battery packs 110 and 112, and higher capacity shuffler 146 is connected to battery packs 114 and 116. Each battery pack connects to a higher capacity shuffler and a lower capacity shuffler. Thus the higher capacity shufflers and the lower capacity shufflers alternate in connecting pairs of battery packs together along a connected series of battery packs 108. This embodiment connection allows a simpler repetitive logic and switching to implement the charge (or discharge)-then-equalize process.

For example, higher capacity shuffler 107 can charge battery pack 112 from battery pack 110, and higher capacity shuffler 146 can charge battery pack 114 from battery pack 116. Similar charge (or discharge) operations can occur simultaneously along the connected chain of battery packs in the battery power system 108. Then, lower capacity shuffler 136 equalizes the charge between battery pack 112 and battery pack 114. Again, similar equalizing operations can occur simultaneously along the connected chain of battery packs in the battery power system 108. The processor 106 can control repetitive cycles of these two operations to charge-then-equalize the entire battery system 108.

Figure 5:
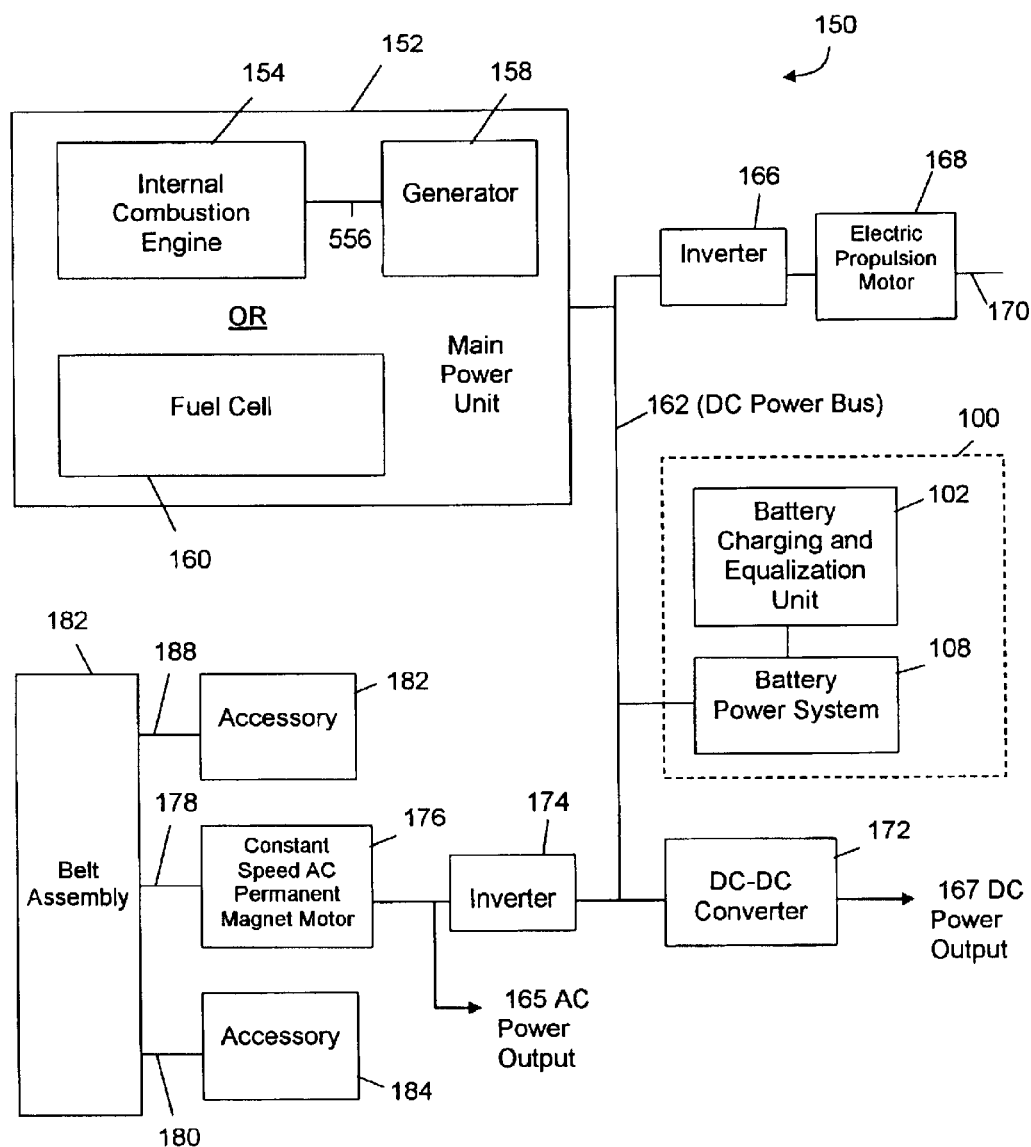
FIG. 5 schematically illustrates a system of battery charging and equalization in a vehicle in accordance with another embodiment of the present invention.

The battery charging and equalization system 100 can be used in a variety of devices that utilize battery power, such as the battery power source in an electric-hybrid vehicle as illustrated in FIG. 5. Electric-hybrid vehicle 150 comprises a main power unit 152 with at least one power generating source that can provide power to a high voltage DC power bus 162. The power generating source may comprise an internal combustion engine 154 coupled to a generator 158 through a drive shaft 156, a fuel cell 160, a micro-turbine (not shown) or any other source capable of providing adequate power.

DC power bus 162 can provide power to various vehicle accessories. For example, an inverter 166 can be electrically coupled to DC power bus 162 to provide AC power to electric motor 168 that propels the vehicle 150 using a drive shaft 170. A second inverter 174 can be coupled to DC power bus 162 to provide AC power to an electric accessory motor 176 and other vehicle accessories 165. The electric accessory motor 176 can then be coupled, e.g. via belt drive assembly 182, with vehicle accessories 182 and 184. Although FIG. 4 shows only two vehicle accessories coupled with electric accessory motor 176, a plurality of accessories can be driven by electric accessory motor 176, such as air compressors, water pumps, hydraulic pumps, and vacuum pumps. Vehicle accessories can also be coupled with DC power bus 162 via DC-DC converter 172. A more detailed description of electric-hybrid vehicle 150 can be found in U.S. patent application Ser. No. 10/160877 entitled "System and Method for Powering Accessories in a Hybrid Vehicle", filed on May 31, 2002.

In FIG. 4, DC power bus 162 is coupled with main power unit 152 and battery power system 108, which in turn is coupled with charging and equalization unit 102. Battery power system 108 can comprise one or more battery packs and can be charged by main power unit 152 via DC power bus 162. Once battery power system 108 is sufficiently charged, it can be used to drive DC power bus 162 allowing part or all of main power unit 152 to be shut off. For example, if the main power unit 152 comprises internal combustion engine 154, DC power bus 162 can use battery power supplied by system 108 to drive vehicle accessories and/or electric propulsion motor 168 while internal combustion engine 154 is shut down. Battery charging and equalization unit 102 can be configured to monitor, charge, discharge and/or equalize charge on the battery packs comprising battery power system 108 as described herein.

What is claimed is:

1. In a battery power system comprising a plurality of battery packs, a method for charging and equalizing battery packs by transferring charge between battery packs, the method comprising:
    a) while the plurality of battery packs are not receiving energy from a power source external to the plurality of battery packs;
    b) determining if an adjacent neighbor battery pack is a candidate for receiving charge or supplying charge;
    c) selecting a battery pack to transfer charge from;
    d) transferring charge from the battery pack selected to transfer charge from to the battery pack selected to transfer charge to and equalizing charge therebetween;
    e) continuously and simultaneously performing steps b–d to multiple pairs of battery packs in parallel while the plurality of battery packs are not receiving energy from a power source external to the plurality of battery packs.

2. The method of claim 1 wherein determining if an adjacent neighbor battery pack is a candidate for receiving charge or supplying charge further comprises determining if an adjacent neighbor battery pack is fully charged.

3. The method of claim 1 further comprising discharging a battery pack.

4. The method of claim 1 wherein determining if an adjacent neighbor battery pack is a candidate for receiving charge or supplying charge includes determining if an adjacent neighbor battery pack is a candidate for discharging then charging.

5. The method of claim 1 wherein each battery pack comprises a plurality of batteries.

6. The method of claim 5 wherein charging and equalizing battery packs by transferring charge between battery packs occurs between battery packs and between batteries.

7. In a vehicle comprising a main power unit, a DC power bus, and a battery power system comprising a pair of battery packs, a method of charging and equalization battery packs by transferring charge between battery packs, the method comprising:
    a) while the plurality of battery packs are not receiving energy from a power source external to the plurality of battery packs;
    b) determining if an adjacent neighbor battery pack is a candidate for receiving charge or supplying charge;
    c) selecting a battery pack to transfer charge from;
    d) transferring charge from the battery pack selected to transfer charge from to the battery pack selected to transfer charge to and equalizing the charge therebetween;
    e) continuously and simultaneously performing steps b–d to multiple pairs of battery packs in parallel while the plurality of battery packs are not receiving energy from a power source external to the plurality of battery packs.

8. The method of claim 7 wherein determining if an adjacent neighbor battery pack is a candidate for receiving charge or supplying charge further comprises determining if an adjacent neighbor battery pack is fully charged.

9. The method of claim 7 further comprising discharging a battery pack.

10. The method of claim 9 wherein determining if an adjacent neighbor battery pack is a candidate for receiving charge or supplying charge includes determining if an adjacent neighbor battery pack is a candidate for discharging then charging.

11. The method of claim 7 wherein each battery pack comprises a plurality of batteries.

12. The method of claim 11 wherein for charging and equalizing battery packs by transferring charge between battery packs occurs between battery packs and between batteries.

13. A battery charging and equalization system, comprising:
    a plurality of battery packs;
    a battery charging and equalization unit coupled with each of the battery packs, the battery charging and equalization unit configured a) while the plurality of battery packs are not receiving energy from a power source external to the plurality of battery packs, b) to determine if an adjacent neighbor battery pack is a candidate for receiving charge or supplying charge, c) select a battery pack to transfer charge from, d) transfer charge from the battery pack selected to transfer charge from to the battery pack selected to transfer charge to and equalize charge therebetween, e) to continuously and simultaneously perform b–d to multiple pairs of battery packs in parallel while the plurality of battery packs are not receiving energy from a power source external to the plurality of battery packs.

14. The battery power system of claim 13, wherein the battery and charging and equalization unit comprises a processor coupled with each battery pack, the processor, configured to determine if an adjacent neighbor battery pack is a candidate for receiving charge or supplying charge, select a battery pack to transfer charge from, direct charge transfer, direct discontinuation of charge transfer, and direct equalization of charge level between the battery packs.

15. The battery power system of claim 13, wherein the battery and charging and equalization unit comprises a charge shuffler coupled with each battery pack, the charge shuffler configured to transfer charge, discontinue charge transfer, and equalize charge level between battery packs.

16. The battery power system of claim 13, wherein the battery and charging and equalization unit comprises a controller, the controller configured to direct operation of the battery and charging and equalization system.

17. The battery power system of claim 13, wherein the battery and charging and equalization unit is configured to perform steps b–e while at least one of the plurality of battery packs are active and supplying stored energy, and the plurality of battery packs are passive and neither supplying nor receiving stored energy.

18. The battery power system of claim 13, wherein the battery and charging and equalization unit comprises a monitor, the monitor configured to obtain charge level data from the battery packs.

19. The battery power system of claim 13, wherein each of the battery packs comprises a plurality of batteries.

20. The battery power system of claim 19, wherein the battery and charging and equalization unit is further coupled with each of the batteries, the battery charging and equalization unit configured to determine if a battery is a candidate for charging, select a battery to transfer charge from, transfer charge, discontinue charge transfer, and equalize charge level between batteries.

21. The battery power system of claim 13, further comprising a plurality of battery packs and a plurality of lower power shufflers each coupled with a pair of battery packs, the lower power shufflers configured to equalize charge levels between battery packs.

22. In a vehicle comprising a main power unit and a DC power bus, a system capable of the charging and equalization of battery packs by transferring charge between battery packs, the system comprising:
   a plurality of battery packs;
   a battery charging and equalization unit coupled with each of the battery packs, the battery charging and equalization unit configured a) while the plurality of battery packs are not receiving energy from a power source external to the plurality of battery packs, b) to determine if an adjacent neighbor battery pack is a candidate for receiving charge or supplying charge, c) to select a battery pack to transfer charge from, d) to transfer charge from the battery pack selected to transfer charge from to the battery pack selected to transfer charge to and equalize charge therebetween, e) to continuously and simultaneously perform b–d to multiple pairs of battery packs in parallel while the plurality of battery packs are not receiving energy from a power source external to the plurality of battery packs.

23. The battery power system of claim 22, wherein the battery and charging and equalization unit comprises a processor coupled with each battery pack, the processor configured to determine if an adjacent neighbor battery pack is a candidate for receiving charge or supplying charge, select a battery pack to transfer charge from, direct charge transfer, direct discontinuation of charge transfer, and direct equalization of charge level between the battery packs.

24. The battery power system of claim 22, wherein the battery and charging and equalization unit comprises a charge shuffler coupled with each battery pack, the charge shuffler configured to transfer charge, discontinue charge transfer, and equalize charge level between battery packs.

25. The battery power system of claim 22, wherein the battery and charging and equalization unit comprises a controller, the controller configured to direct operation of the battery and charging and equalization system.

26. The battery power system of claim 22, wherein the battery and charging and equalization unit is configured to perform steps b–e while at least one of the plurality of battery packs are active and supplying stored energy, and the plurality of battery packs are passive and neither supplying nor receiving stored energy.

27. The battery power system of claim 22, wherein the battery and charging and equalization unit comprises a monitor, the monitor configured to obtain charge level data from the battery packs.

28. The battery power system of claim 22, wherein each of the battery packs comprises a plurality of batteries.

29. The battery power system of claim 28, wherein the battery and charging and equalization unit is further coupled with each of the batteries, the battery charging and equalization unit configured to determine if a battery is a candidate for charging, select a battery to transfer charge from, transfer charge, discontinue charge transfer, and equalize charge level between batteries.

30. The battery charging and equalization system of claim 22 farther comprising a plurality of battery packs and a plurality of lower power shufflers each coupled with a pair of battery packs, the lower power shufflers configured to equalize charge levels between battery packs.

31. The method of claim 1, further including performing steps b–e while at least one of the plurality of battery packs are active and supplying stored energy, and the plurality of battery packs are passive and neither supplying nor receiving stored energy.

32. The method of claim 7, further including performing steps b–e while at least one of the plurality of battery packs are active and supplying stored energy, and the plurality of battery packs are passive and neither supplying nor receiving stored energy.

* * * * *